US006719662B2

United States Patent
Forrest et al.

(10) Patent No.: US 6,719,662 B2
(45) Date of Patent: Apr. 13, 2004

(54) ELECTROMAGNETICALLY LOCKING DIFFERENTIAL

(75) Inventors: James L. Forrest, Ashley, IN (US); Robert Leeper, Fort Wayne, IN (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

(21) Appl. No.: 10/154,198

(22) Filed: May 22, 2002

(65) Prior Publication Data

US 2003/0040390 A1 Feb. 27, 2003

Related U.S. Application Data

(60) Provisional application No. 60/314,082, filed on Aug. 22, 2001.

(51) Int. Cl.$^7$ ............................................. F16H 48/20
(52) U.S. Cl. ........................................ 475/231; 475/150
(58) Field of Search ................................ 475/150, 231, 475/240

(56) References Cited

U.S. PATENT DOCUMENTS

| | | | | |
|---|---|---|---|---|
| 4,612,825 A | | 9/1986 | Engle | 475/231 |
| 5,226,861 A | | 7/1993 | Engle | 475/234 |
| 5,366,421 A | * | 11/1994 | Hirota | 475/231 |
| 5,464,084 A | * | 11/1995 | Aoki et al. | 475/150 |
| 5,556,344 A | | 9/1996 | Fox | 475/235 |
| 5,989,147 A | | 11/1999 | Forrest et al. | 475/231 |
| 6,019,694 A | | 2/2000 | Forrest et al. | 475/150 |
| 6,076,644 A | | 6/2000 | Forrest et al. | 192/66.2 |
| 6,165,095 A | | 12/2000 | Till et al. | 475/150 |
| 6,261,202 B1 | | 7/2001 | Forrest et al. | 475/235 |
| 6,309,320 B1 | | 10/2001 | Forrest et al. | 475/150 |
| 6,428,441 B1 | * | 8/2002 | Hunt | 475/231 |
| 6,436,002 B1 | * | 8/2002 | Ishikawa et al. | 475/231 |
| 6,460,677 B1 | * | 10/2002 | Roscoe | 475/150 |
| 6,537,172 B1 | * | 3/2003 | McAuliffe, Jr. et al. | 475/150 |
| 6,582,336 B2 | * | 6/2003 | Forrest et al. | 475/150 |

\* cited by examiner

*Primary Examiner*—Ha Ho
(74) *Attorney, Agent, or Firm*—Baker & Daniels

(57) ABSTRACT

A differential assembly including a rotatable casing having an axis of rotation, a selectively energized electromagnet proximal the casing, and a rotatable first clutch disposed within the casing, the first clutch placed in operative engagement with the casing in response to the electromagnet being energized. Relative rotation between the first clutch and the casing is slowed by their being in operative engagement. A rotatable clutch hub and a second clutch are disposed within the casing, and the casing and the clutch hub are rotatably coupled through engagement of the second clutch, which is operatively engaged in response to relative rotation between the first clutch and the casing being slowed. At least one rotatable pinion gear is disposed within the casing and revolves about the axis of rotation. At least one side gear engaged with the pinion gear and rotatable about the axis of rotation is disposed within the casing, and is rotatably coupled to the casing through the second clutch during engagement of the second clutch. Neither of the first clutch and the second clutch is appreciably engaged with the casing in response to gear separating forces exerted between the pinion gear and the side gear.

19 Claims, 10 Drawing Sheets

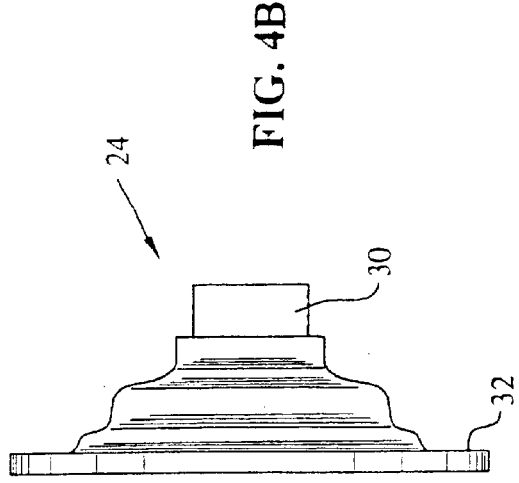
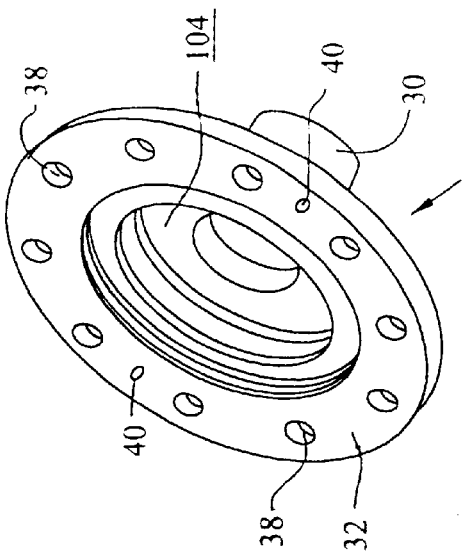
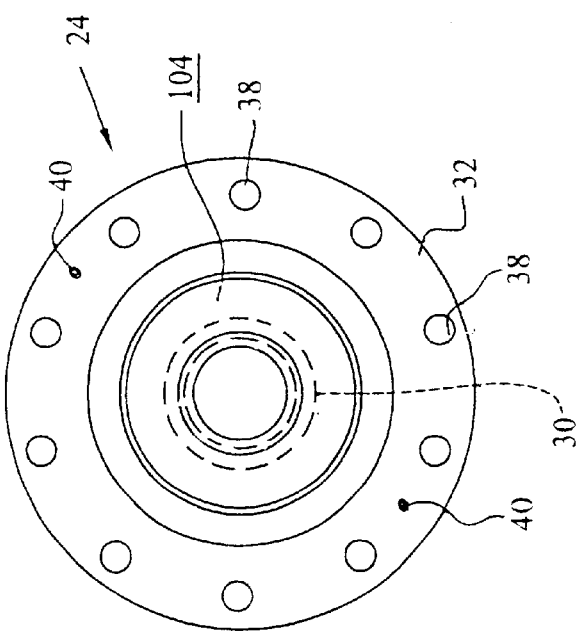
FIG. 4B
FIG. 4C
FIG. 4A

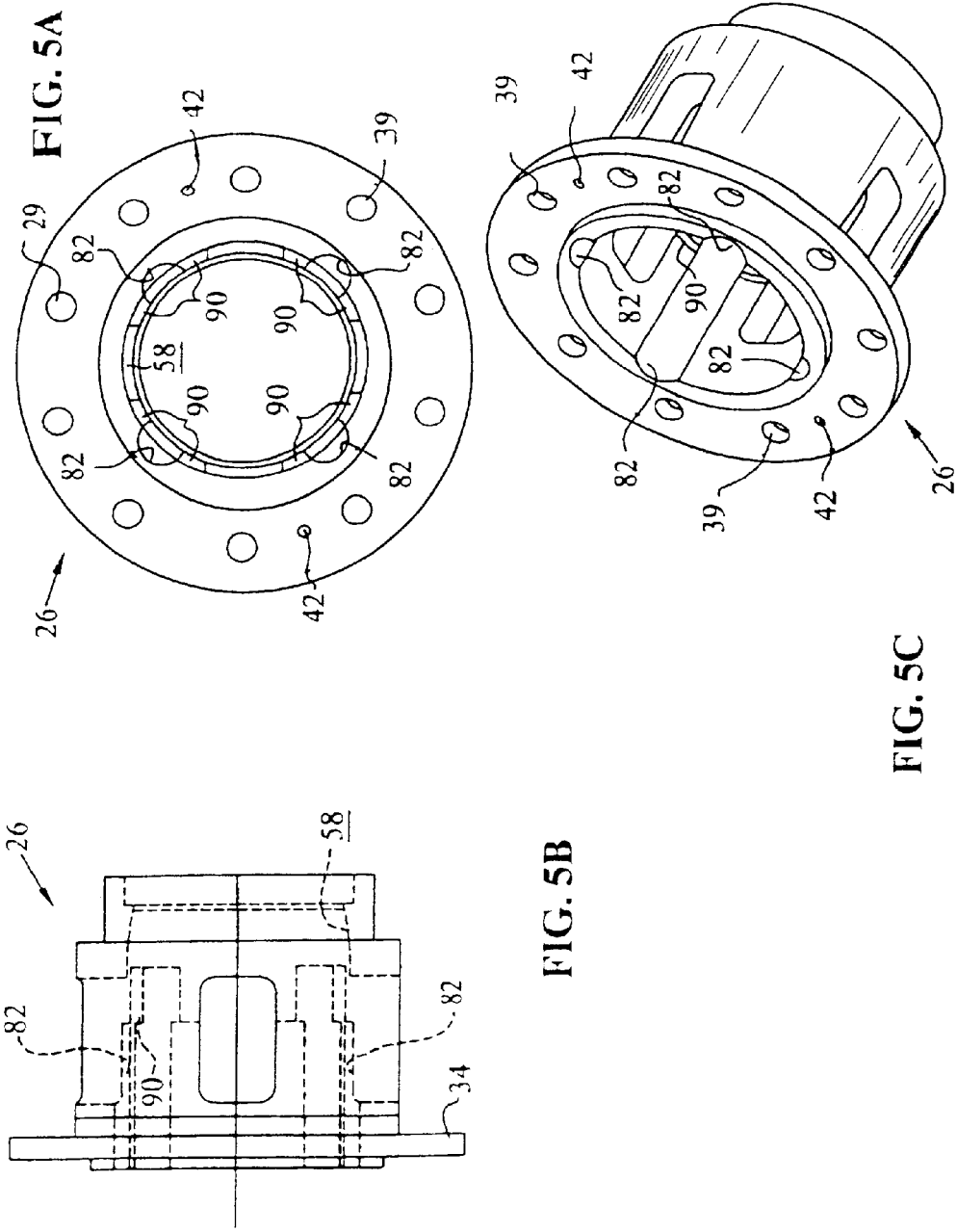

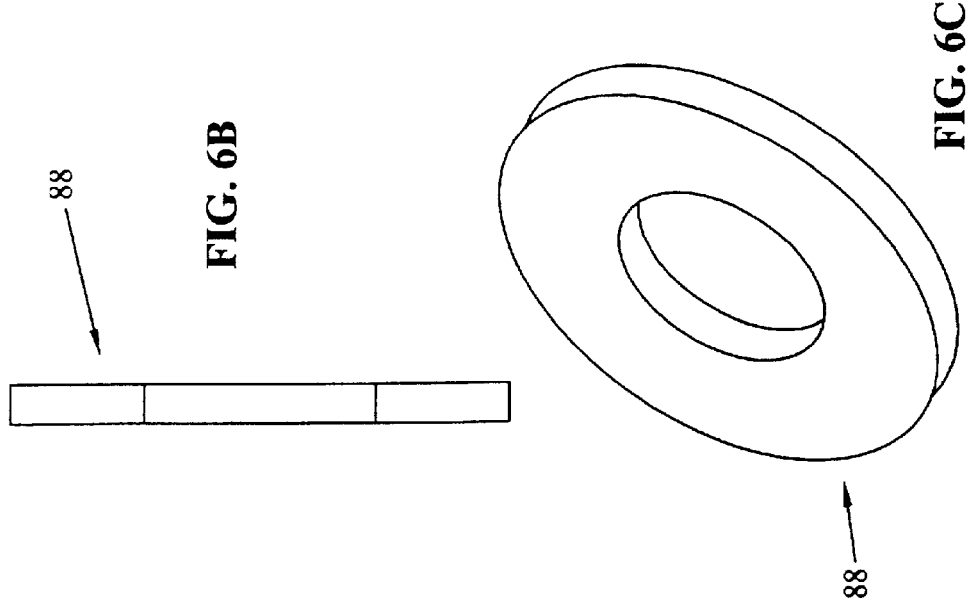
FIG. 6B
FIG. 6C
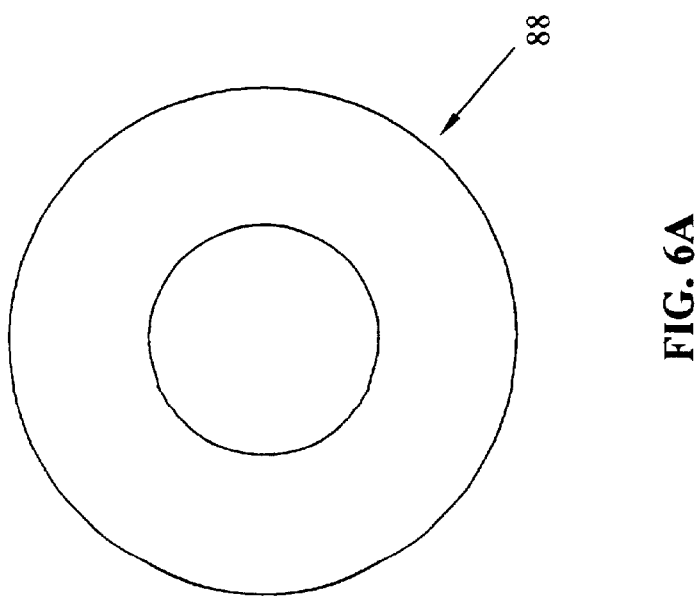
FIG. 6A

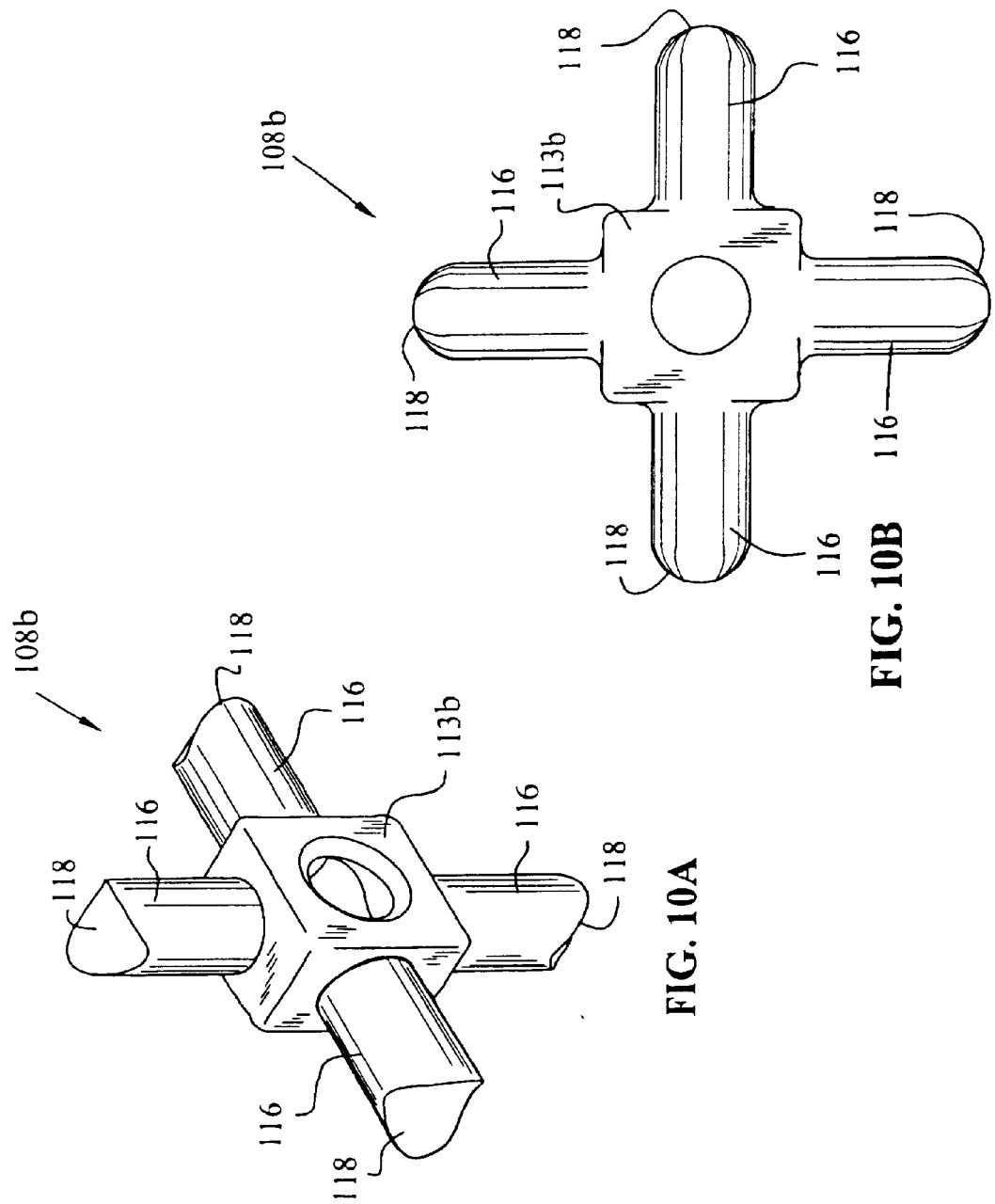

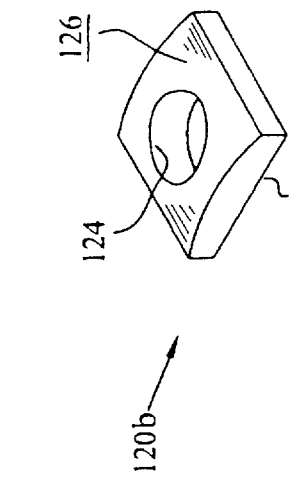
FIG. 11A
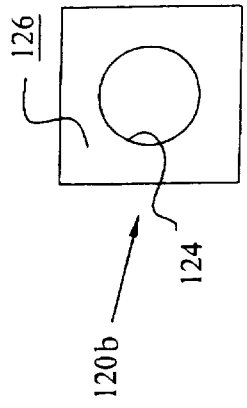
FIG. 11B
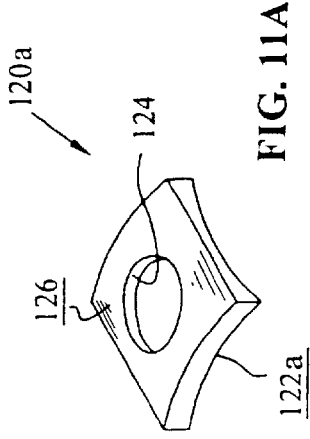
FIG. 11C
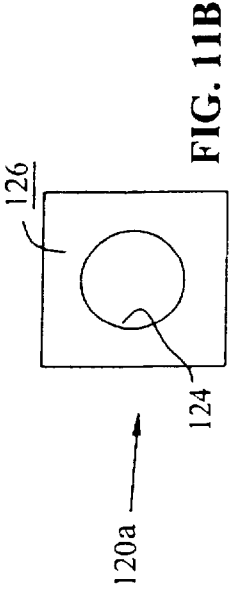
FIG. 11D
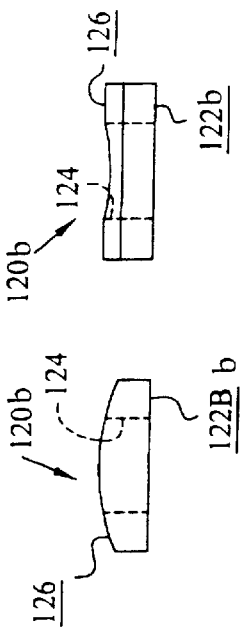
FIG. 12A
FIG. 12B
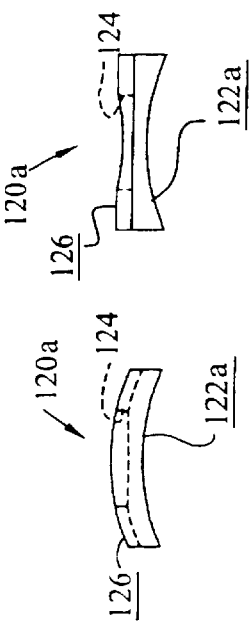
FIG. 12C
FIG. 12D

ELECTROMAGNETICALLY LOCKING DIFFERENTIAL

CROSS REFERENCE TO RELATED APPLICATION

This application claims the benefit of U.S. Provisional Patent Application Ser. No. 60/314,082 filed 08/22/2001, which is incorporated herein by reference in its entirety.

BACKGROUND OF THE INVENTION

The present invention relates to limited slip differentials, and more particularly to limited slip differentials having an electromagnetically actuated clutch.

Differentials are well known in the prior art and allow each of a pair of output shafts or axles operatively coupled to a rotating input shaft to rotate at different speeds, thereby allowing the wheel associated with each output shaft to maintain traction with the road while the vehicle is turning. Such a device essentially distributes the torque provided by the input shaft between the output shafts.

The completely open differential, i.e., a differential without clutches or springs which restrict relative rotation between the axles and the rotating differential casing, is suitable, and even preferable, for normal, dry driving conditions, but is not well suited to slippery conditions in which one driven wheel experiences a much lower coefficient of friction than the other driven wheel: for instance, when one wheel of a vehicle is located on a patch of ice and the other wheel is on dry pavement. Under such conditions, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior means for limiting slippage between the axles and the differential casing use a frictional clutch mechanism, clutch plates and/or a frustoconical engagement structure, operatively located between the rotating casing and the axles. Certain embodiments of such prior means provide a clutch element attached to each of the side gears, and which frictionally engages a mating clutch element attached to the rotating casing or, if the clutch is of the conical variety, a complementary interior surface of the casing itself. Such embodiments may also include a bias mechanism, usually a spring, to apply an initial preload between the clutch and the differential casing. By using a frictional clutch with an initial preload, a minimum amount of torque is always applied to a wheel having traction, e.g., a wheel located on dry pavement. The preload allows the clutch to be more readily fully engaged and generally provides limited slip differential which is more quickly responsive to demands for increased traction.

Limited slip differentials often employ clutches which move, and may become at least partially engaged or preloaded, in response to axial movement of the side gears. Usually two side gears are disposed internal to the differential casing and are each rotatably fixed to one of the two axle shafts. Axial movement of the side gears typically results in response to gear separating forces acting between the pinion gears which revolve about the casing's axis of rotation and the side gears intermeshed therewith. The gear separating forces urge the two side gears axially outward, away from each other, causing the clutch to lightly engage and develop additional torque at the driven wheels. Examples of such limited slip differentials which comprise cone clutches are disclosed in U.S. Pat. Nos. 4,612,825 (Engle), 5,226,861 (Engle) and 5,556,344 (Fox), each of which is assigned to Auburn Gear, Inc., the disclosures of which are all expressly incorporated herein by reference.

Such differentials have certain amount of internal drag during cornering on dry pavement, when the axle is unlocked and relative rotation occurs between the rotating casing and the axles. This drag, although facilitating faster locking of the differential, is somewhat undesirable in that it results in vehicle inefficiencies and possibly higher temperatures within the differential casing or axle housing, and causes differential component wear.

Certain embodiments of such limited slip differentials utilize an electromagnet having a wire coil to effect the initiating force and actuate the clutch, as disclosed in U.S. Pat. Nos. 5,989,147 (Forrest et al.), 6,019,694 (Forrest et al.), and 6,165,095 (Till et al.), each of which is assigned to Auburn Gear, Inc., the disclosures of which are all expressly incorporated herein by reference. Each of these references discloses an electromagnet which, when selectively energized, actuates a clutch within the differential. The electromagnet is mounted in fixed relationship to the axle housing and is rotatably supported by the differential casing. Alternatively, as disclosed in U.S. Pat. No. 6,309,320 (Forrest et al.), which is assigned to Auburn Gear, Inc., the disclosure of which is expressly incorporated herein by reference, the electromagnet may be fixedly supported by the axle housing. In either case, activation of the electromagnet results in the axle being rotatably locked to the rotating differential casing through the clutch. Relative to some other types of limited slip differentials, those having electromagnetically-actuated clutches enjoy the advantages of variable and/or selective engagement, often at a lower cost.

Cone clutches are generally better suited than disc-type clutches as the clutch elements brought into engagement electromagnetically owing to their unitary, ferrous structure, which provides a superior flux path. However, the load carrying capability of a cone clutch is limited, for a given axial engagement force, by the magnitude of the included angle formed by its engagement surfaces. Typically, these angles range from 9° to 12.5°. The smaller this angle, the greater the torque capacity of the cone clutch. The smaller this angle, however, the harsher the clutch engagement, and the lesser the tendency for the clutch to release. On the other hand, clutches having multiple interleaved discs or plates, or "clutch packs," which are well known in the art, generally have greater torque capacity than a cone clutch of approximately equal package size. Moreover, the required tolerances associated with manufacturing disc clutches tend to be somewhat looser than with cone clutches. Clutch packs, however, do not respond as well as cone clutches do in response to a magnetic actuation force.

Some prior art electromagnetically-actuated limited slip differentials employ both cone and plate clutches, thereby enjoying superior actuation performance and load-carrying capabilities. Such a differential is disclosed in U.S. patent application Ser. No. 10/090,666, filed Mar. 5, 2002, and entitled "Electromagnetically-Actuated Limited Slip Differential," the complete disclosure of which is expressly incorporated herein by reference. These differentials, however, still have some preload on at least one of the clutches.

Some prior art electromagnetically-actuated limited slip differentials employ both cone and plate clutches, thereby enjoying superior actuation performance and load-carrying capabilities. Such a differential is disclosed in U.S. patent application Ser. No. 10/090,666, filed Mar. 5, 2002, now U.S. Pat. No. 6,582,336, and entitled "Electromagnetically-Actuated Limited Slip Differential," the complete disclosure of which is expressly incorporated herein by reference. These differentials, however, still have some preload on at least one of the clutches.

It is desirable to provide an electromagnetically actuated locking differential of high torque capacity which, when its coil is deenergized, reverts to being an open differential having no preloaded clutch(es), thereby eliminating the above-mentioned drag internal to the differential and thus improving vehicle efficiency and reducing differential temperatures and component wear.

SUMMARY OF THE INVENTION

The present invention provides an electromagnetically actuated locking differential assembly which, when its coil is deenergized, reverts to a open differential having no clutch preload.

The present invention provides a differential assembly including a rotatable casing having an axis of rotation, a selectively energized electromagnet proximal the casing, and a rotatable first clutch disposed within the casing, the first clutch placed in operative engagement with the casing in response to the electromagnet being energized. Relative rotation between the first clutch and the casing is slowed by their being in operative engagement. A rotatable clutch hub and a second clutch are disposed within the casing, and the casing and the clutch hub are rotatably coupled through engagement of the second clutch, which is operatively engaged in response to relative rotation between the first clutch and the casing being slowed. At least one rotatable pinion gear is disposed within the casing and revolves about the axis of rotation. At least one side gear engaged with the pinion gear and rotatable about the axis of rotation is disposed within the casing, and is rotatably coupled to the casing through the second clutch during engagement of the second clutch. Neither of the first clutch and the second clutch is appreciably engaged with the casing in response to gear separating forces exerted between the pinion gear and the side gear.

The present invention also provides a differential assembly including a rotatable casing having an axis of rotation, a selectively energized electromagnet proximal the casing, and rotatable first and second clutches disposed within the casing and placed in operative engagement with the casing during times when the electromagnet is energized. Disposed within the casing are a rotatable pinion gear revolving about the axis of rotation, and a side gear enmeshed with the pinion gear and rotatable about the axis of rotation, the side gear being rotatably coupled to the casing through the second clutch during engagement of the second clutch. Means are also provided for isolating the first and second clutches from gear separating forces exerted between the pinion gear and the side gear, and preventing appreciable engagement of the first and second clutches with the casing during times when the electromagnet is not energized.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 4A is an interior end view of a first casing portion of the differential assembly of FIG. 1;

FIG. 4B is a side view of the casing portion shown in FIG. 4A;

FIG. 4C is an oblique view of the casing portion shown in FIG. 4A;

FIG. 5A is an end view of a second casing portion of the differential assembly shown in FIG. 1;

FIG. 5B is a side view of the casing portion shown in FIG. 5A;

FIG. 5C is an oblique view of the casing portion shown in FIG. 5A;

FIG. 6A is a plan view of the side gear backing plate of the differential assembly of FIG. 1;

FIG. 6B is a side view of the side gear backing plate shown in FIG. 6A;

FIG. 6C is an oblique view of the side gear backing plate shown in FIG. 6A;

FIG. 10A is an oblique view of a second embodiment of the pinion shaft and block assembly of the differential assembly shown in FIG. 1;

FIG. 10B is a plan view of the pinion shaft/block of FIG. 10A;

FIG. 11A is an oblique view of a first embodiment of a thrust washer used in the differential assembly of FIG. 1;

FIG. 11B is a plan view of the thrust washer shown in FIG. 11A;

FIG. 11C is a first side view of the thrust washer shown in FIG. 11A;

FIG. 11D is a second side view of the thrust washer shown in FIG. 11A;

FIG. 12A is an oblique view of a second embodiment of a thrust washer used in the differential assembly of FIG. 1;

FIG. 12B is a plan view of the thrust washer shown in FIG. 12A;

FIG. 12C is a first side view of the thrust washer shown in FIG. 12A; and

FIG. 12D is a second side view of the thrust washer shown in FIG. 12A.

Figure 1:
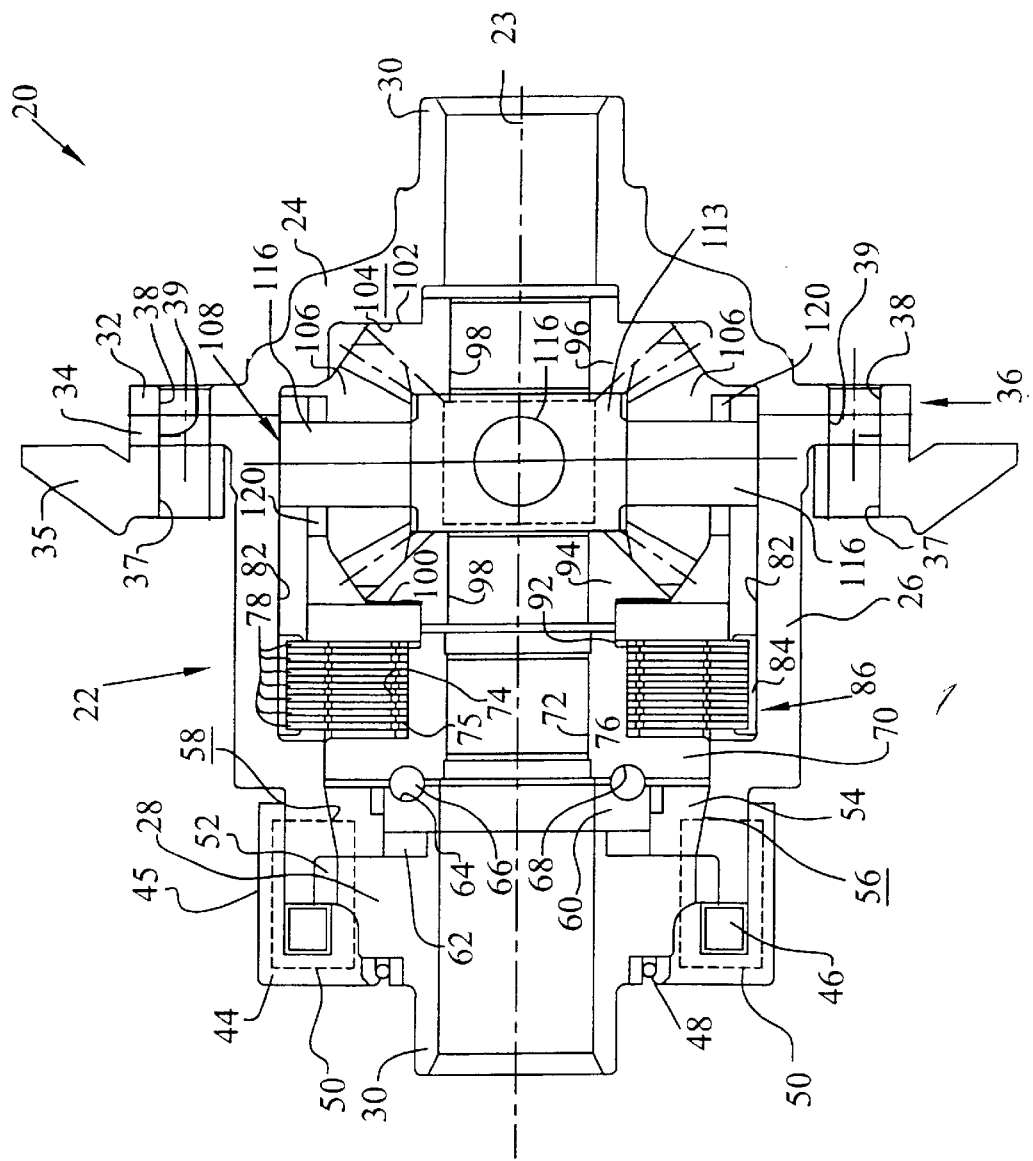
FIG. 1 is a sectional side view of a differential assembly according to the present invention, also showing a ring gear attached thereto.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention in several forms, and such exemplifications are not to be construed as limiting the scope of the invention in any manner.

DETAILED DESCRIPTION OF THE INVENTION

The embodiments disclosed below is not intended to be exhaustive or limit the invention to the precise forms disclosed in the following detailed description. Rather, the embodiments are chosen and described so that others skilled in the art may utilize their teachings.

Figure 2:
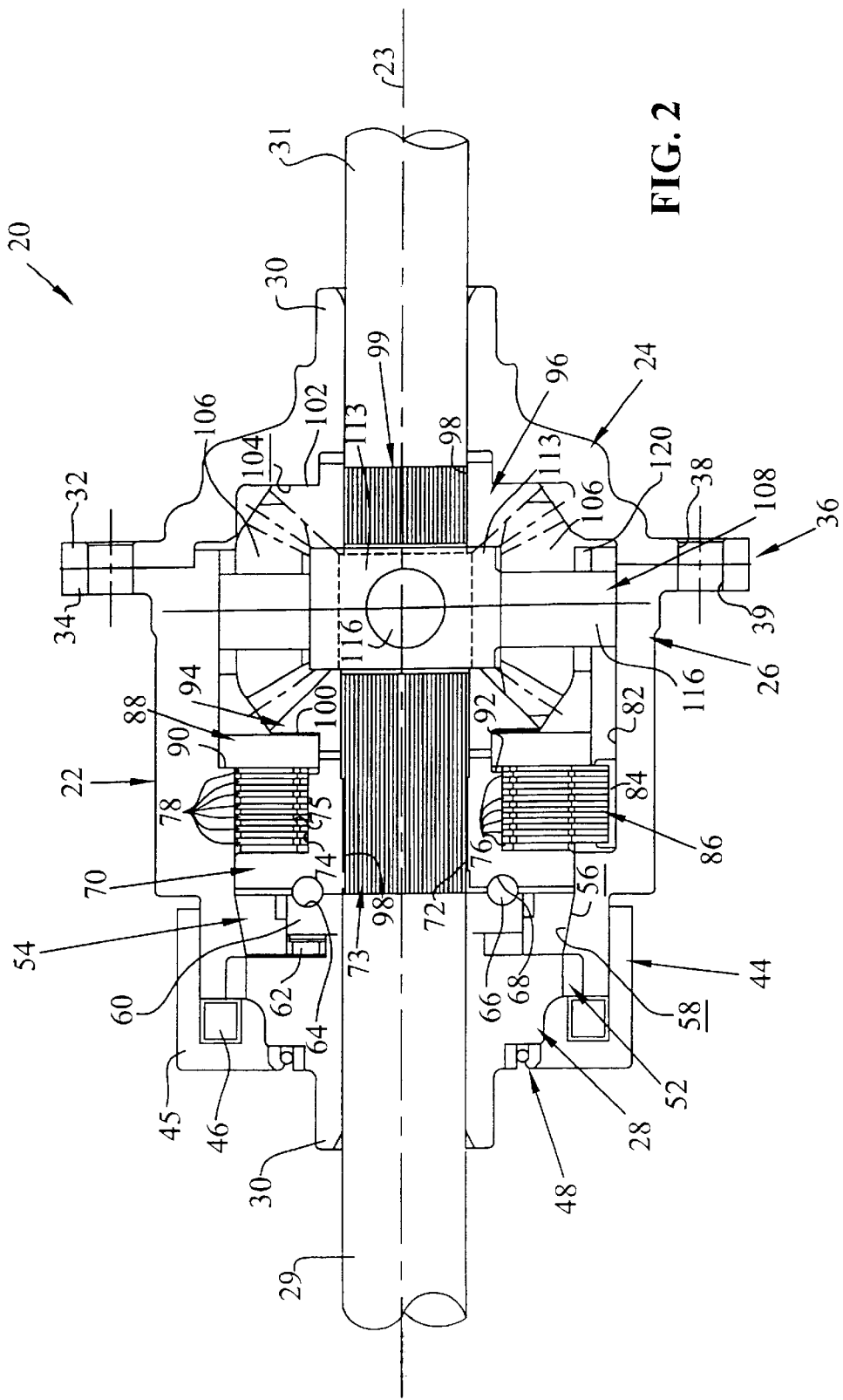
FIG. 2 is a second sectional side view of the differential assembly of FIG. 1, also showing the axles driven by the differential assembly.
Figure 3:
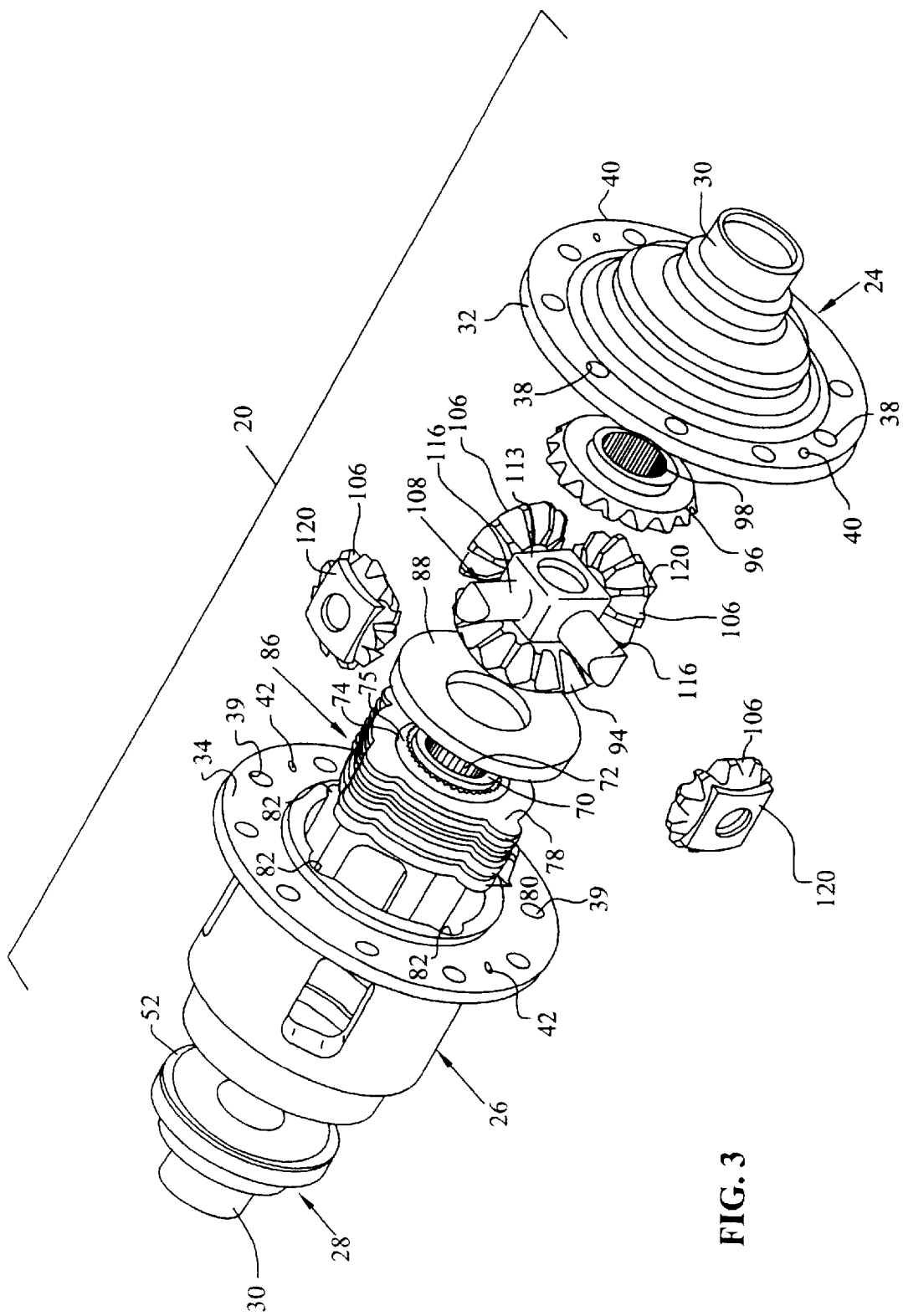
FIG. 3 is an exploded view showing major components of the differential assembly of FIG. 1.

Referring to FIGS. 1, 2 and 3, differential assembly 20 has casing 22 which is rotatable about axis of rotation 23. Casing 22 is comprised of first casing portion 24, second casing portion 26 and endcap 28. First casing portion 24 and endcap 28 each include cylindrical hub 30 about which is disposed a bearing (not shown) through which differential assembly 20 is rotatably supported within an axle housing (not shown). Differential assembly 20 may be installed into either a front wheel drive or a rear wheel drive axle housing. As described further hereinbelow, axle shafts 29 and 31 (FIG. 2) are inserted through hubs 30 and are rotatably fixed to side gears 94 and 96 of the differential assembly. Axles 29 and 31 are retained in their axial positions through an engagement device (not shown) which retains their movement relative to the axle housing in a suitable and commonly known manner.

First casing portion 24 includes radially extending planar portion 32, and second casing portion 26 includes radially extending planar portion 34. Radially extending portions 32 and 34 abut and form casing flange 36. Radially extending portion 32 includes a plurality of circumferentially distributed clearance holes 38 therethrough; radially extending portion 34 includes a like plurality of clearance holes 39 therethrough which are aligned with holes 38. Ring gear 35 (FIG. 1) abuts radially extending portion 34 of the second casing portion. Ring gear 35 is provided with a plurality of circumferentially distributed threaded holes 37 which are aligned with holes 38 and 39. Bolts (not shown) extend through clearance holes 38 and 39, and are threadedly received in holes 37 to attach ring gear 35 to casing 22, these bolts further securing first and second casing portions 24 and 26 together.

Referring to FIG. 3, radially extending casing portions 32 and 34 are also respectively provided with at least two holes 40 and 42 which are aligned and receive small shipping bolts (not shown) for retaining first and second casing portions 24 and 26 during initial assembly of differential assembly 20, prior to installation of ring gear 35. Thus, differential assembly 20 may be conveniently shipped from its assembly point sans ring gear, which may be installed at the time the differential assembly is installed into its axle housing. The shipping bolts may extend with clearance through one of holes 40 and 42, and be threadedly received in the other.

Electromagnet 44 comprises ferrous cup 45 and coil 46 and is disposed adjacent endcap 28. Electromagnet is rotatably fixed relative to the axle housing and its cup 45 is rotatably supported on casing 22 by bearing 48. With reference to FIG. 1, toroidal flux path 50 about coil 46 is generated as electric current is passed through the coil. In accordance with the teachings of U.S. Pat. Nos. 5,989,147 and 6,165,095, the magnitude and direction of this current may be variable. Flux path 50 flows through electromagnet cup 45, the adjacent portion of second casing portion 26, cone clutch 54 and the ferrous portion of endcap 28. Endcap 28 may comprise annular nonmagnetic portion 52 in accordance with the teachings of U.S. Pat. No. 6,019,694 to help direct the path of flux path 50. Annular nonmagnetic portion 52 may be threadedly engaged with second casing portion 26.

Cone clutch 54 is provided with frustoconical surface 56 which, upon actuation of electromagnet 44, is selectively drawn into frictional engagement with mating frusto-conical surface 58 provided on the interior of second casing portion 26. Cone clutch 54 may be of the type described in U.S. Pat. Nos. 6,076,644 (Forrest et al.) or 6,261,202 (Forrest et al.), each of which is assigned to Auburn Gear, Inc., the disclosures of which are both expressly incorporated herein by reference, or of any other suitable structure. The included angle between the engagement surfaces of cone clutch 54 is sufficient to facilitate ready release of the cone clutch upon removal of the electromagnetic field. This angle may be approximately 12.5°, for example. Cone clutch 54 is coupled to ramp ring 60 through a known cam arrangement which can axially displace clutch 54 and ring 60 in response to their being relatively rotated. A plurality of interengaged, circumferentially distributed cam surfaces are provided on the interfacing axial surfaces of cone clutch 54 and ramp ring 60, and during normal operation, with electromagnet 44 not energized, the respective cam surfaces are fully seated and the cone clutch and ramp ring are not axially displaced.

Ramp ring 60 is not rotatably fixed to axle 29 extending through it, and is supported against the interior surface of endcap 28 through roller thrust bearing 62; i.e., it cannot move leftward as viewed in FIGS. 1 and 2. When electromagnet 44 is energized, cone clutch 54 is drawn toward endcap 28 and into engagement with surface 58, which slows the relative rotation between the cone clutch and the casing, and initiates relative rotation between the cone clutch and the ramp ring which urges the ramp ring to move rightward as viewed in FIGS. 1 and 2. As described further hereinbelow, this rightward movement brings the discs of the clutch pack into initial engagement.

The axial side of ramp ring 60 opposite cone clutch 54 is provided with a plurality of circumferentially distributed slots and ramps 64 in which are disposed a like plurality of balls 66. Adjacent ramp ring 60 is clutch hub 70, which has a like number of circumferentially distributed slots and ramps 68, in which balls 66 are also received, thereby completing a ball ramp arrangement. The ball ramp arrangement axially distances ramp ring 60 and clutch hub 70 in response to relative rotation therebetween. Relative rotation between ramp ring 60 and clutch hub 70 is initiated by cone clutch 54 being brought into frictional engagement with surface 58 of second casing portion 26. The frictional engagement between the clutch and the casing causes the ramp ring and clutch hub to rotate relative to one another and balls 66 to roll along ramps 64 and 68, forcing clutch hub 70 rightward as viewed in FIGS. 1 and 2 and bringing the discs of the clutch pack into tighter engagement, as described further hereinbelow.

Clutch hub 70, which may be considered a component part of the second clutch, is provided with a plurality of internal splines 72 which mate with splines 73 provided on axle 29 (FIG. 2). Clutch hub 70 is also provided with a plurality of external splines 74 which are engaged with internal splines 75 provided on each of a plurality of annular clutch plates 76, thereby rotatably fixing them together. Interposed between adjacent ones of clutch plate 76 is an annular clutch plate 78. As shown in FIG. 3, each of the plurality of clutch plates 78 is provided with four circumferentially distributed tabs or ears 80 which project radially from its circular outer periphery.

With reference to FIGS. 3 and 5, it can be seen that the internal surface of second casing portion 26 is provided with four grooves or recesses 82 which extend axially therealong. Grooves 82 each have a substantially circular surface, and tabs 80 of clutch plates 78 are slidably received in grooves 82 to prevent rotation of the clutch plates relative to casing 22. With reference to FIGS. 1 and 2, it can be seen that interleaved clutch plates 76 and 78 may be preassembled and retained in a stack by a retainer 84. So assembled, retainer 84 and clutch plate 76 and 78 form clutch pack 86.

Located adjacent the rightmost clutch plate 78, as viewed in FIGS. 1 and 2, is annular side gear backing plate 88, shown in greater detail in FIG. 6. Backing plate 88, which may be steel, abuts circumferentially-segmented step 90 (FIGS. 2 and 5) formed inside second casing portion 26. In abutting step 90, leftward movement of backing plate 88 toward the clutch pack is prevented, and thus the clutch pack is isolated from the effects of gear separating forces. The cone clutch, even further removed from backing plate 88, is also isolated from the effects of gear separating forces, as can be readily understood with reference to FIGS. 1 and 2.

Disposed between backing plate 88 and clutch hub 70 is Belleville spring 92 which acts to separate clutch hub 70 and backing plate 88. Belleville spring 92 urges clutch hub 70 leftward as viewed in FIGS. 1 and 2 such that balls 66 are urged into their fully seated positions within slots 64 and 68, and ramp ring 60 bears against endcap 28 through bearing 62. Thus, it will be understood that Belleville spring 92 acts urge clutch plates 76 and 78 out of frictional engagement with one another. With electromagnet 44 deenergized, cone clutch 54 tends to rotate freely with ramp ring 60, their interacting cams being fully seated within each other, and there is no appreciable frictional engagement between frustoconical surfaces 56 and 58.

The above-described arrangement provides a limited slip differential which, when electromagnet 44 is selectively energized, brings clutch plates 76 and 78 into frictional engagement, thereby limiting or eliminating relative rotation between casing 22 and clutch hub 70. Further, this arrangement allows no appreciable preload to be exerted on either cone clutch 54 or clutch pack 86 during normal driving conditions, thereby providing a completely open differential when electromagnet 44 is deenergized.

Differential 20 is provided with side gears 94 and 96, each provided with internal splines 98 which engage splines 73 and 99 provided on axles 29 and 31, respectively (FIG. 2). Annular thrust washer 100, which may be a medium carbon heat treated steel, is disposed between interfacing surfaces of backing plate 88 and side gear 94 (FIG. 1). Thrust washer 102, which may be identical to thrust washer 100, is disposed between surface 104 of first casing portion 24 and the interfacing surface of side gear 96. Axially outward movement of side gears 94, 96 is confined by backing plate 88 and surface 104, thereby preventing gear separating forces from exerting a preload on the clutches, as described above.

Figure 7:
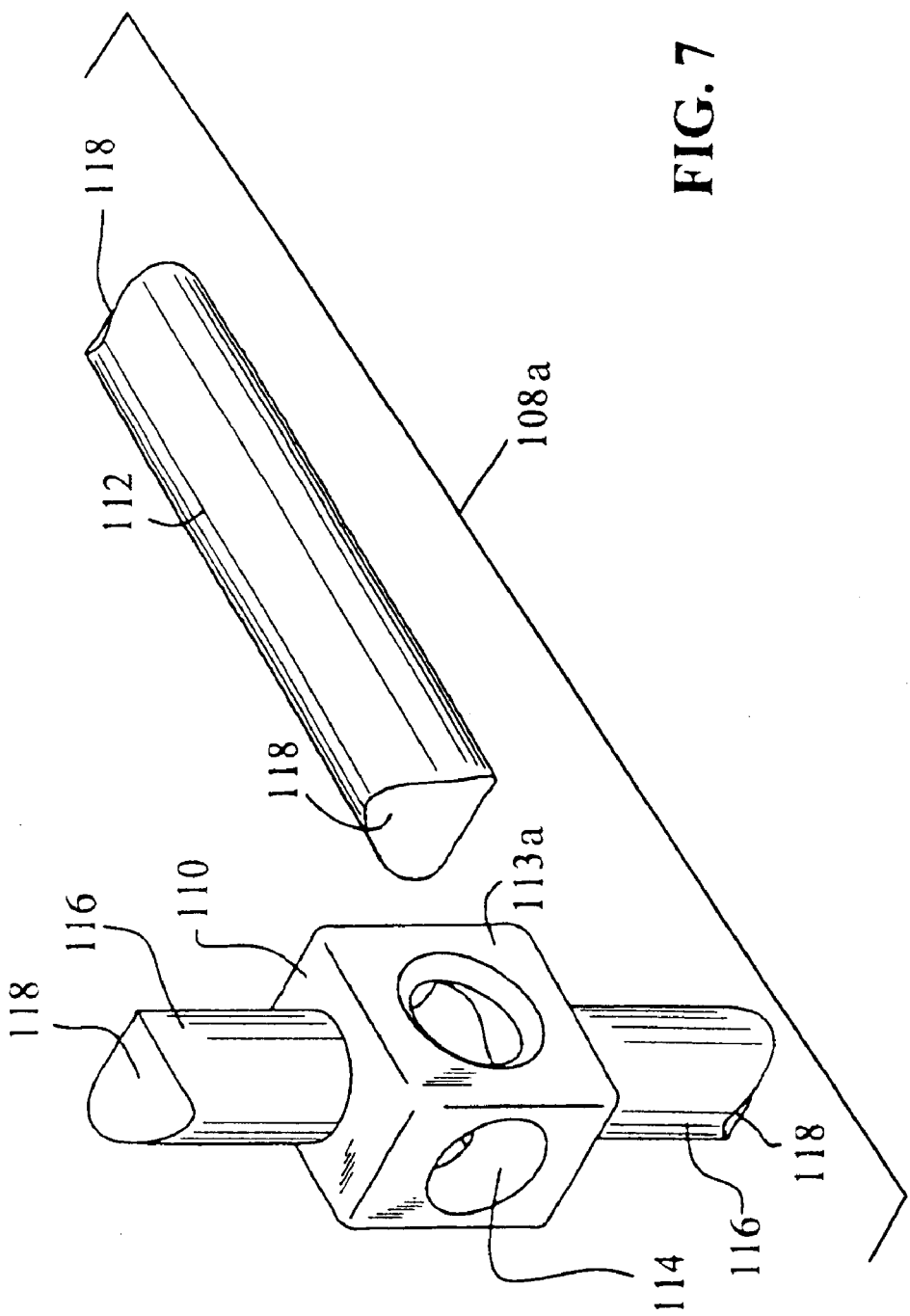
FIG. 7 is an oblique, disassembled view of a first embodiment of a pinion shaft/block assembly of the differential shown in FIG. 1.
Figure 9A:
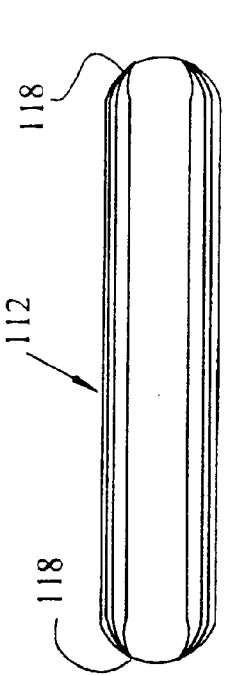
FIG. 9A is a first side view of the shaft shown in FIG. 7.
Figure 9B:
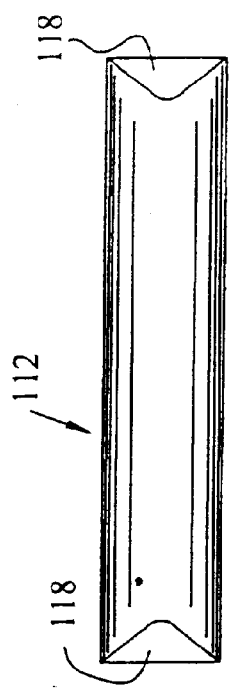
FIG. 9B is a second side view of the shaft shown in FIG. 7.
Figure 8B:
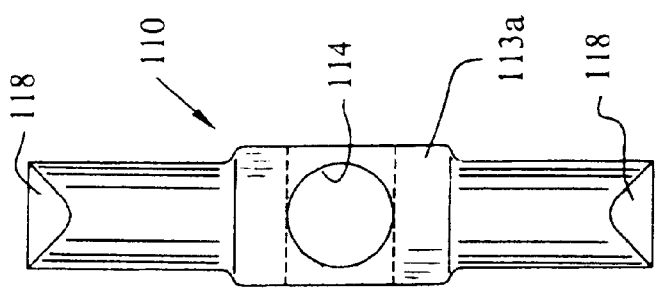
FIG. 8B is a second side view of the block shown in FIG. 7.
Figure 8A:
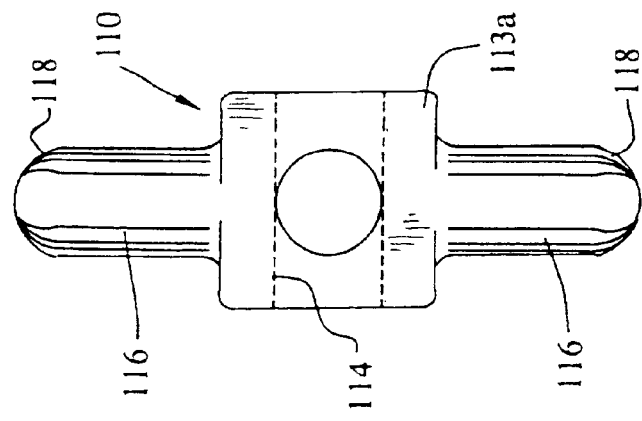
FIG. 8A is a first side view of the block assembly shown in FIG. 7.

Four pinion gears 106 are intermeshed with side gears 94 and 96 and are rotatably positioned on pinion shaft/block 108. Pinion gears 106 revolve about axis of rotation 23 as casing 22 and pinion shaft/block 108 rotate. With reference to FIGS. 7–9, first embodiment pinion shaft/block 108a comprises block member 110 and separate shaft member 112, each of which may be medium carbon steel. Block member 110 has a central substantially parallelepiped or block portion 113a provided with hole 114 through which shaft member 112 extends. The ends of axles 29 and 31 may abut the block portion. Radially extending from portion 113a are integral shaft portions 116 about which two of pinion gears 106 are rotatably disposed. The other two of the pinion gears 106 are disposed on the exposed portions of shaft member 112 which extend from portion 113a. The free ends of shaft portions 116 and shaft member 112 are provided with a semicircular profile which allows these free ends to be slidably received within grooves 82 to prevent relative rotation of the pinion shaft/block relative to casing 22.

FIG. 10 illustrates second embodiment pinion shaft/block 108b, which may also be made of medium carbon steel, but which is of unitary construction. Pinion shaft/block 108b is substantially identical in structure and function to assembled first embodiment pinion shaft/block 108a, but has central block portion 113b from which extend four shaft portions 116 about which pinion gears 106 are rotatably disposed. During operation, when clutch plates 76 and 78 are being compressed, the rightward movement of backing plate 88 is opposed by side gear 94, which abuts portion 113 of pinion shaft/block 108a or 108b. Rightward movement of pinion shaft/block 108, as viewed in FIGS. 1 and 2, is opposed by side gear 96 which likewise abuts its block portion 113. As noted above, rightward movement of side gear 96 is opposed through thrust washer 102 and surface 104 of first casing portion 24.

A thrust washer 120 is disposed between the interfacing surfaces of each pinion gear 106 and the interior of second casing portion 26. Referring to FIG. 11, first embodiment thrust washer 120a is provided with a substantially spherical inwardly facing surface 122a which would slidably abut a mating spherical surface of pinion gear 106, as shown in FIG. 3. Shaft member 112 or shaft portions 116 of pinion shaft/block 108a or 108b extends through hole 124. Outwardly facing thrust washer surface 126 is curved and contoured to match the curvature of the mating surface of casing portion 26.

FIG. 12 illustrates second embodiment of thrust washer 120b which is substantially identical in structure and function to thrust washer 120a except that it is provided with planar inwardly facing surface 122b which slidably abuts the planar mating surface of pinion gears 106, as shown in FIGS. 1 and 2. Thrust washers 120a and 120b may be medium carbon heat treated steel.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A differential assembly comprising:
   a rotatable casing having an axis of rotation;
   a selectively energized electromagnet proximal the casing;
   a rotatable cone clutch disposed within the casing, the cone clutch placed in operative engagement with the casing in response to the electromagnet being energized, wherein relative rotation between the cone clutch and the casing is slowed by their being in operative engagement;
   a rotatable clutch hub disposed within the casing;
   a second clutch disposed within the casing, the casing and the clutch hub being rotatably coupled through engagement of the second clutch, the second clutch being operatively engaged in response to relative rotation between the cone clutch and the casing being slowed;

at least one rotatable pinion gear disposed within the casing and revolving about the axis of rotation; and a side gear enmeshed with the at least one rotatable pinion gear and rotatable about the axis of rotation and disposed within the casing, the side gear being rotatably coupled to the casing through the second clutch during engagement of the second clutch;

wherein neither cone clutch nor the second clutch is appreciably engaged with the casing in response to gear separating forces exerted between the pinion gear and the side gear.

2. The differential assembly of claim 1, wherein said second clutch comprises said clutch hub.

3. The differential assembly of claim 1, wherein the second clutch comprises a plurality of interleaved clutch discs.

4. The differential assembly of claim 1, wherein the cone clutch and second clutch are both disposed on the same side of the side gear.

5. The differential assembly of claim 1, wherein the clutch hub is axially displaced in response to engagement of the cone clutch.

6. The differential assembly of claim 5, wherein the second clutch is engaged in response to axial displacement of the clutch hub.

7. The differential assembly of claim 1, further comprising a ramp ring disposed between the cone clutch and the clutch hub, the cone clutch and the clutch hub in operative engagement through the ramp ring.

8. The differential assembly of claim 7, wherein the ramp ring and the cone clutch are axially displaced in response to relative rotation therebetween.

9. The differential assembly of claim 7, wherein the ramp ring and the clutch hub are axially displaced in response to relative rotation therebetween.

10. The differential assembly of claim 9, further comprising a ball ramp arrangement through which the ramp ring and the clutch hub are in operative engagement.

11. The differential assembly of claim 1, further comprising a backing plate disposed between the second clutch and the side gear, the backing plate in engagement with the casing, movement of the side gear toward the second clutch being limited by the backing plate, whereby the second clutch is isolated from the effects of gear separation forces acting between the at least one pinion gear and the side gear.

12. The differential assembly of claim 1, wherein the second clutch is biased into a disengaged condition.

13. The differential assembly of claim 1, further comprising a pair of side gears, a pinion shaft/block disposed within the casing and having integral block and shaft portions, the shaft portions being engaged with the casing, the pinion gear rotatably disposed about the shaft portion, the block portion disposed between the pair of the side gears.

14. The differential assembly of claim 13, wherein the shaft/block further comprises a separate shaft member which extends through the block portion, the separate shaft member being engaged with the casing, the pinion gear rotatably disposed about the separate shaft member.

15. The differential assembly of claim 14, wherein the differential assembly comprises four pinion gears, two of the pinion gears being respectively rotatably disposed on the shaft portions and the separate shaft member.

16. A differential assembly comprising:

a rotatable casing having an axis of rotation;

a selectively energized electromagnet proximal the casing;

a rotatable first clutch disposed within the casing and placed in operative engagement with the casing during times when the electromagnet is energized;

a rotatable second clutch disposed within the casing and placed in operative engagement with the casing during times when the electromagnet is energized, said second clutch comprising a rotatable clutch hub, said clutch hub axially displaced in response to engagement of said first clutch, engagement of said second clutch being effected by axial displacement of said clutch hub;

at least one rotatable pinion gear disposed within the casing and revolving about the axis of rotation;

a side gear enmeshed with the at least one rotatable pinion gear and rotatable about the axis of rotation and disposed within the casing, the side gear being rotatably coupled to the casing through the second clutch during engagement of the second clutch; and means for isolating the first and second clutches from gear separating forces exerted between the pinion gear and the side gear, and preventing appreciable engagement of the first and second clutches with the casing during times when the electromagnet is not energized.

17. The differential assembly of claim 16, wherein said second clutch is engaged in response to said first clutch first being engaged.

18. The differential assembly of claim 16, wherein a ball ramp arrangement is located between said first clutch and said clutch hub, said axial displacement of said clutch hub being effected in response to relative rotation between said first clutch and said clutch hub.

19. The differential assembly of claim 16, wherein movement of said side gear toward said second clutch is impeded by said means.

* * * * *